Dec. 15, 1953   R. S. SCHWARTZ   2,662,803
RECORDING METHOD AND APPARATUS
Filed June 29, 1949

*INVENTOR.*
ROBERT S. SCHWARTZ
BY Carl V. Olson
*ATTORNEY*

Patented Dec. 15, 1953

2,662,803

UNITED STATES PATENT OFFICE 2,662,803

RECORDING METHOD AND APPARATUS

Robert S. Schwartz, Bronxville, N. Y., assignor to Faximile, Inc., New York, N. Y., a corporation of Delaware Application June 29, 1949, Serial No. 102,136

19 Claims. (Cl. 346—1)

The present invention relates to electrolytic recording, and more particularly, to means for and method of recording on a medium which is electro-conductive when heated.

Electrolytic recording, as practiced at the present time, involves the passage of a recording electric current through a moist conductive medium such as paper impregnated with an aqueous electrolyte. The paper also includes chemicals which change color on the passage of current. Such a recording paper is set forth in Pat. No. 2,339,267 to John V. L. Hogan et al. Moist electrolytic papers have met with considerable commercial success but they have the disadvantage that they must be kept in humidors until just prior to recording in order to maintain the proper moisture content. To overcome the disadvantages of moist electrolytic paper, I have developed a paper impregnated with meltable colorless compounds, the paper being white, dry and substantially non-conductive at ordinary temperatures, but conductive and markable by electric currents when the impregnating compound is melted at elevated temperatures. For a complete description of this recording medium, reference is had to a copending application Serial No. 305,757 filed April 23, 1953. The present invention is concerned with a method and means for utilizing this new recording paper.

There are prior art recorders which employ heating means to dry out moist electrolytic recording paper subsequent to the recording process to render the finished recording dry and suitable for handling. There are also prior art recorders which employ heating means to speed the chemical reaction taking place during the marking process. In addition, there are recorders which operate on the principle of applying heat to elemental areas of a heat-developing recording medium, the marking being in accordance with the heat applied. None of these recorders is suitable for use with a recording medium which is electro-conductive solely at elevated temperatures. The recorders of the present invention are constructed in accordance with principles and considerations foreign to all the prior art recorders of which I am aware.

It is the general object of this invention to provide means for and method of electrically recording on a medium which is electro-conductive at elevated temperatures.

It is another object to provide a recorder wherein heat is applied to a small area of the recording medium for the purpose of rendering it electro-conductive.

It is a further object to provide a recorder wherein heat is applied to the recording medium immediately prior to its reaching the recording electrodes.

It is a further object to provide a recorder including means for applying heat to the recording medium without interfering with the functioning of the recording electrodes.

It is a further object to provide a continuously-operative recorder capable of heating an area of the recording medium to render it electro-conductive and applying an electric recording current to an elemental part of the heated area.

It is a further object to provide a method and apparatus for marking a recording medium including a meltable impregnant which aids in the recording process when in a liquid state.

Pursuant to these objects and other objects which will be apparent to those skilled in the art, I provide means for moving a sheet of paper between and in contact with two electrodes carrying electrical signals to be recorded on the paper; and also heating means for maintaining that portion of the paper between the electrodes at a sufficiently high temperature to render it electro-conductive.

For a better understanding of the invention, reference is had to the following specification and the appended drawings; wherein.

Figure 1:
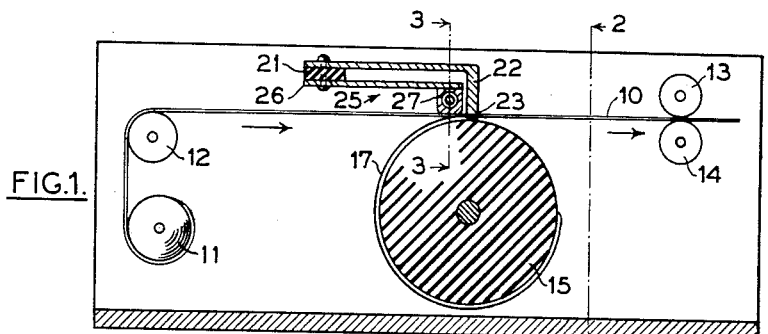
Fig. 1 is a longitudinal sectional view of a blade-and-helix type recorder constructed in accordance with the teaching of this invention.
Figures 2, 4:
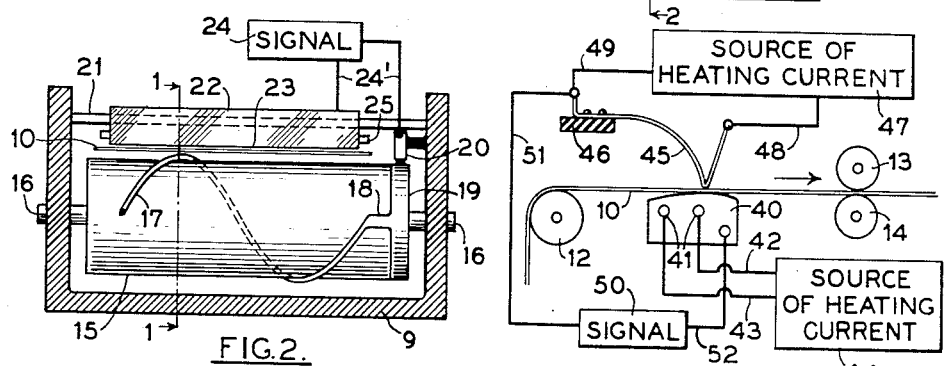
Fig. 2 is a transverse sectional view taken on the line 2—2 of Fig. 1.
Fig. 4 is a simplified elevation of a stylus-type recorder constructed according to the teaching of this invention.
Figure 3:
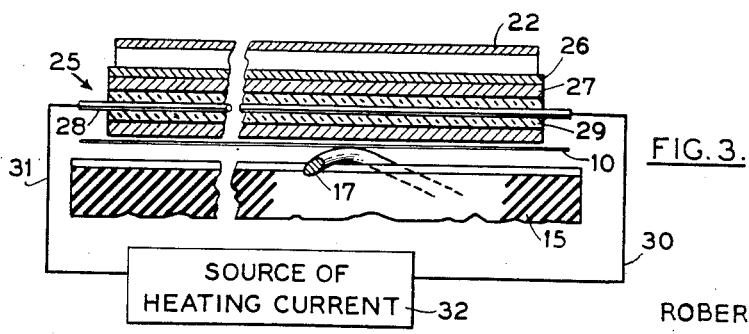
Fig. 3 is a fragmentary section taken on the line 3—3 of Fig. 1.

Referring now in greater detail to Figs. 1 through 3 of the drawings, a channel-shaped frame 9 supports the various parts. Impregnated paper 10 is drawn from supply roll 11 over roll 12 by means of driven feed rolls 13 and 14, all rolls being journaled in the side members of frame 9. An insulating cylindrical helix drum 15 rotates on shaft 16, journaled in frame 9, and is provided with a protruding helical electrode 17 connected at 18 to a slip ring 19. A brush 20 provides electrical contact through slip ring 19 to helical electrode 17. Insulating crossbar 21 on frame 9 supports a resilient linear or blade electrode 22 in a manner such that its linear edge 23 contacts paper 10 on a line parallel with the axis of drum 15. A source 24 of electrical signals to be recorded is connected through wires 24' to blade electrode 22 and brush 20.

In order to make the paper 10 conductive so that current will flow between the electrodes at their point of intersection, there is provided a heater assembly, generally designated 25, comprising a support 26 secured at one end to crossbar 21 and at the other end to a hollow heater bar 27. A high-resistance heating wire 28 or coil passes longitudinally through heater bar 27 and is electrically insulated therefrom by cylindrical sleeve 29. Wires represented by 30 and 31 connect opposite ends of heating wire 28 to a source 32 of heating current. The heater assembly is disposed so that it heats the moving paper 10 immediately prior to its entrance between linear electrode 22 and helical electrode 17. The heater may be designed to elevate the temperature of the paper to between 150 deg. F. and 400 deg. F. depending on the type of paper employed.

In operation, helix drum 15 is rotated at a speed such that it makes one revolution in the time that feed rolls 13 and 14 advance the paper 10 a distance about equal to the width of linear edge 23 of blade electrode 22. A recording signal from source 24, which may be a radio facsimile receiver, is applied to electrodes 22 and 17. The recording current flows through the paper 10 at a spot determined by the intersection of helical electrode 17 with blade electrode 22. This spot moves across the paper with each revolution of drum 15 to record the signal point-by-point and line-by-line. The heater 25 applies heat to the paper 10 in advance of its reaching electrodes 22 and 17 so that it is at the proper temperature for electro-conductivity when it passes therebetween.

Referring now to Fig. 4 for a description of other forms of the invention, feed rolls 13 and 14 draw paper 10 over positioning roll 12 and across the top surface of a combination heater and electrode member 40. Member 40 may be provided with heating elements 41 after the manner shown in Fig. 3, the heating elements being connected by wires 42 and 43 to a source 44 of heating current.

The paper 10 is contacted on the opposite side by a resilient stylus electrode 45 mounted at one end on an insulating crossbar 46. A source of heating current 47 is connected by wires 48 and 49 to opposite ends of stylus electrode 45, the material and dimensions of the stylus and the characteristics of the source being such that heat is generated in the stylus and transferred to the paper at the point of contact therewith. It will be understood that the various elements are operatively disposed in a suitable frame (not shown) in a manner such as that described in connection with Figs. 1 through 3.

A source 50 of electrical signals to be recorded is connected by wires 51 and 52 to stylus electrode 45 and electrode member 40, respectively. Signal currents flow between stylus 45 and member 40 through heated paper 10 resulting in a visible recording on the paper representative of the signal. Time is measured by distance along the paper as correlated with the speed with which feed rolls 13 and 14 draw the paper past the electrodes. A plurality of styli may be employed to record separate signals.

It will be understood that while both stylus 45 and member 40 have been shown and described as provided with heating means, either one or the other solely may be so provided.

It will also be understood that it is within the contemplated scope of this invention to provide a recorder combining features of the forms of the invention described in a manner such that the helical electrode 17 (of Figs. 1-3) is provided with a heating current, and/or heater assembly 25 is positioned and connected to the signal source 24 to act as a combination heater and marking electrode.

Figure 5:
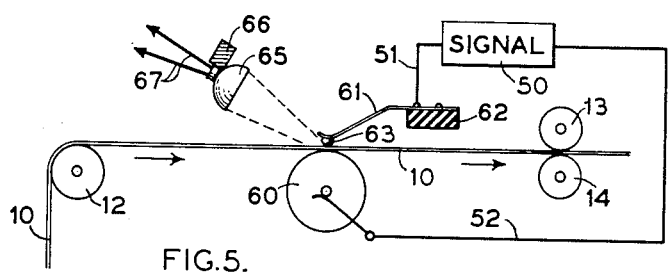
Fig. 5 is a simplified elevation of still another form of the invention.

Fig. 5 is a simplified drawing of another form of the invention having a rotating or stationary electrode 60 on one side of paper 10 and having a cooperating stylus 61 on the other side. Stylus 61 is of resilient material, is mounted at one end on a crossbar 62, and is provided at its other end with a rounded paper-contacting surface 63. A source of signals 50 is connected through wires 51 and 52 to stylus electrode 61 and electrode 60, respectively.

The portion of moving paper 10 which at any instant is between the electrodes 60 and 61 is maintained at a high temperature by means of a heat lamp 65 mounted by a suitable bracket on crossbar 66. Wires 67 are for connection to a source of electricity. Lamp 65 is preferably of the linear type backed by a cylindrical reflector.

While specific forms of the invention have been shown and described in some detail, it will be understood that this has been done by way of illustration, rather than limitation, and that the scope of the invention is to be gathered by reference to the appended claims.

What is claimed is:

1. Electrical recorder means comprising in combination, a recording medium which is initially essentially non-conductive and is electro-conductive when heated and which marks responsively to electric current, a first electrode and a second electrode closely spaced therefrom, means for feeding the recording medium past said electrodes so that the medium completes an electrical circuit therebetween, and heating means positioned to maintain that changing portion of the medium which completes the circuit at a sufficiently high temperature by external application of heat to render the medium electro-conductive.

2. Electrical recorder means comprising in combination, a recording medium which is initially essentially non-conductive and is electro-conductive when heated and which marks responsively to electric current, a first electrode and a second electrode closely spaced therefrom, means for feeding the recording medium past said electrodes so that the medium completes an electrical circuit therebetween, and heating means for maintaining that portion of the medium which completes the circuit at a sufficiently high temperature by external application of heat to render the medium electro-conductive, said heating means being integral with at least one of said electrodes and electrically independent of said circuit.

3. A recorder in accordance with claim 1, wherein the said heating means is positioned immediately adjacent to and in advance of the electrodes in the direction therefrom of movement of the electrodes relative to the medium.

4. A recorder in accordance with claim 1, wherein the said heating means is disposed parallel with and immediately adjacent to the side of the linear electrode from which the medium approaches, whereby the medium is externally heated immediately prior to its entrance between the linear and helical electrodes.

5. The method of electrically recording on a recording medium which is initially non-conductive and becomes electro-conductive solely at elevated temperatures which comprises the steps of applying heat externally to a general area of the medium until it becomes electro-conductive, and passing a marking electric current through an elemental area of said general area.

6. A recorder for marking on a medium responsive to electrical signals comprising in combination a rotatable helical recording electrode, means for conveying the medium past and in contact with the helical electrode, a cooperating linear recording electrode resiliently mounted to contact the medium on the side opposite from the helical electrode to comprise a recording circuit with the helical electrode, and resiliently mounted heater means disposed parallel with and adjacent to the side of the linear electrode from which the medium approaches, said heater means being electrically independent of said circuit and as close to the linear electrode as is consistent with independent relative movement to cause the medium to be heated immediately prior to its entrance between the recording electrodes.

7. A recording device comprising in combination: a recording paper which is initially essentially non-conductive and becomes electro-conductive when heated and which marks on the passage therethrough of electric current, a pair of cooperating recording electrodes, means for feeding the paper between and in contact with said electrodes, and a heater element positioned to raise the temperature of that changing local portion of the paper which is immediately entering between the electrodes and which is actually between the electrodes, by external application of heat.

8. The method of electrically marking a recording medium which is initially essentially non-conductive and becomes electro-conductive as well as responsive to an electric marking current at elevated temperatures which comprises the steps of applying heat externally to an elemental area of the medium until it becomes electro-conductive, and then passing a marking electric current through said area while it is electro-conductive.

9. In a method of electrically marking a recording medium which is initially essentially non-conductive and becomes electro-conductive at elevated temperatures, the steps of applying heat externally to the medium until it becomes electro-conductive, and marking the recording medium.

10. An electrical recorder for use with a recording medium which is initially essentially non-conductive and is electro-conductive when heated and which marks responsively to electric current comprising a first electrode and a second electrode closely spaced therefrom, means for advancing the recording medium past said electrodes so that the medium completes an electric circuit therebetween, and heating means positioned to maintain that changing portion of the medium which completes the circuit at a sufficiently high temperature by external application of heat to render the medium electro-conductive.

11. A recorder in accordance with claim 10, said heating means being positioned adjacent to the electrodes.

12. A recorder in accordance with claim 10, said heating means being remotely positioned from the electrodes.

13. A recorder in accordance with claim 10, said heating means being a source of radiant energy.

14. A recorder in accordance with claim 10, said heating means being integral with at least one of said electrodes.

15. A recorder in accordance with claim 10, said heating means being disposed parallel with and immediately adjacent to the side of the linear electrode from which the medium approaches whereby the medium is heated immediately prior to its entrance between the linear and helical electrodes.

16. A recorder in accordance with claim 10, wherein said heating means is positioned as close to the linear electrode as is consistent with independent relative movement to cause the medium to be heated immediately prior to its entrance between the recording electrodes.

17. The method of marking a recording medium including a markable meltable impregnant, comprising the successive steps of heating the medium by externally applied radiant energy to melt the impregnant to a liquid state in a predetermined area of the medium, and then applying a marking means to a selected portion of said area while the impregnant is still in a liquid state.

18. The method of marking a recording medium containing a markable meltable impregnant comprising the steps of heating the medium at one position to melt the impregnant to a liquid state in a predetermined area of the medium and to render the said area markable, advancing the medium to a marking position, and marking a portion of the area while the impregnant is still in a liquid state.

19. The method of marking an initially dry recording medium including a meltable impregnant comprising the successive steps of heating a selected area of the medium by externally applied energy to melt the impregnant to a liquid state, and then marking a portion of the area while the impregnant is still in a liquid state.

ROBERT S. SCHWARTZ.

References Cited in the file of this patent

UNITED STATES PATENTS

| Number | Name | Date |
| --- | --- | --- |
| 2,227,109 | Shankweiler | Dec. 31, 1940 |
| 2,374,214 | Kline et al. | Apr. 24, 1945 |
| 2,400,544 | Kline et al. | May 21, 1946 |
| 2,454,966 | Faus | Nov. 30, 1948 |
| 2,485,678 | Tribble | Oct. 25, 1949 |
| 2,530,956 | Gibney | Nov. 21, 1950 |